US011911924B2

(12) United States Patent
Gilman

(10) Patent No.: US 11,911,924 B2
(45) Date of Patent: Feb. 27, 2024

(54) RAZOR

(71) Applicant: Bredan, Inc., Naples, FL (US)

(72) Inventor: Scott Gilman, Naples, FL (US)

(*) Notice: Subject to any disclaimer, the term of this patent is extended or adjusted under 35 U.S.C. 154(b) by 0 days.

(21) Appl. No.: 17/984,080

(22) Filed: Nov. 9, 2022

(65) Prior Publication Data

US 2023/0076936 A1 Mar. 9, 2023

Related U.S. Application Data

(63) Continuation of application No. 17/067,517, filed on Oct. 9, 2020, now Pat. No. 11,524,419, which is a continuation of application No. 16/046,410, filed on Jul. 26, 2018, now Pat. No. 10,814,508.

(60) Provisional application No. 62/537,045, filed on Jul. 26, 2017, provisional application No. 62/610,719, filed on Dec. 27, 2017.

(51) Int. Cl.
*B26B 21/52* (2006.01)
*B26B 21/22* (2006.01)
*B26B 21/40* (2006.01)

(52) U.S. Cl.
CPC .......... *B26B 21/521* (2013.01); *B26B 21/225* (2013.01); *B26B 21/522* (2013.01); *B26B 21/4068* (2013.01)

(58) Field of Classification Search
CPC .......... B26B 21/52; B26B 21/521–528; B26B 21/22; B26B 21/222–227
See application file for complete search history.

(56) References Cited

U.S. PATENT DOCUMENTS

| | | | | |
|---|---|---|---|---|
| 2,565,062 | A * | 8/1951 | Blanchard | B26B 21/24 30/40 |
| 3,871,076 | A * | 3/1975 | Perry | B26B 21/32 30/60.5 |
| 4,916,814 | A * | 4/1990 | Althaus | B26B 21/24 30/57 |
| 7,721,451 | B2 * | 5/2010 | Psimadas | B26B 21/4062 30/527 |
| 9,902,078 | B2 * | 2/2018 | Lopez | B26B 21/523 |
| 10,654,184 | B1 * | 5/2020 | Richitelli | B26B 21/4043 |
| 10,843,357 | B2 * | 11/2020 | Jang | B26B 21/225 |
| 10,882,200 | B1 * | 1/2021 | Shabel | B26B 21/165 |
| 11,014,255 | B2 * | 5/2021 | Robertson | B26B 21/4012 |
| 2012/0198698 | A1 * | 8/2012 | Szczepanowski | B26B 21/521 30/531 |

* cited by examiner

*Primary Examiner* — Adam J Eiseman
*Assistant Examiner* — Richard D Crosby, Jr.
(74) *Attorney, Agent, or Firm* — Lippes Mathias LLP

(57) ABSTRACT

A razor apparatus including a head having at least one blade member on each of a first and a second opposed side of the head. Each blade member has a straight front cutting edge. The head includes a frame defining an opening through which the cutting edges are accessible. The frame also includes a rotatable mounting element for attachment of the head to a handle. The head is rotatable around a longitudinal axis of the handle at least 180° when the rotatable mounting element is activated.

17 Claims, 11 Drawing Sheets

RAZOR

This application is a continuation of U.S. application Ser. No. 17/067,517 filed Oct. 9, 2020, which claims the benefit of U.S. Application Ser. No. 16/046,410 filed Jul. 26, 2018, which claims the benefit of U.S. Provisional Application No. 62/537,045, filed Jul. 26, 2017 and U.S. Provisional Application No. 62/610,719, filed Dec. 27, 2017, the disclosures of which are hereby incorporated by reference.

BACKGROUND

The present exemplary embodiment relates to a razor.

Modern razors are often made with either one or multiple parallel strip-like razor blades secured upon the head of the razor. A handle extends from the head. The user holds the handle and scrapes the head in one direction along the skin so the blade or blades will cut the hair. After each movement in one direction, when the stroke is completed, the user lifts the razor and brings it back to a point near the original starting position for a second stoke in the same direction. Unfortunately, the blades in typical razors dull fairly rapidly with use. Thus, either a blade cartridge or the entire razor is frequently replaced, typically after just a dozen or less shaves.

International application No. WO 97/27030 discloses a razor with a reversible blade unit, in order to extend the useful life of the blade unit. The blade unit is engaged in a housing and is provided with turning knobs, located at either end of the blade unit. Upon the dulling of the cutting edges on one side of the blade unit, the user turns the knobs such that the dulled cutting edges are rotated to the rear of the housing while the still sharp, unused cutting edges are rotated such that they are exposed at the front of the housing and are then ready for use.

One disadvantage of such a razor is that, when the user wants to turn the knobs, his soapy hands might slip on the knobs, thereby preventing him from turning the blade unit in a single movement. Another disadvantage of such a razor is that the knobs are thin and located near the blades, wherein any wrong move might result in the user cutting his fingers.

U.S. Pat. No. 9,259,846 describes one type of reversible razor. FIGS. 1 and 2 depict a manual (i.e. non-powered) shaving device 10 useful for shaving human hair. Shaving device 10 comprises a disposable head assembly 20 to shave the hair of a user of shaving device 10, as well as a handle 60 to hold and manipulate the shaving device 10. Many features of the illustrated razor are relevant to the present disclosure. As such, the subject matter of U.S. Pat. No. 9,259,846 is herein incorporated by reference.

The illustrated prior art disposable head assembly 20 comprises a blade cartridge 22 and a blade cartridge support member 24. Blade cartridge support member 24 comprises a generally U-shaped cartridge support frame 26. U-shaped cartridge support frame 26 comprises two generally curved support arms 30.

To facilitate pivotable attachment of blade cartridge 22 to the blade cartridge support member 24, the blade cartridge 22 and the blade cartridge support member 24 may include pivot assembly 3 that allows the blade cartridge 22 to rotate about a pivot axis PA. The pivot assembly 3 may be configured to allow the blade cartridge 22 to rotate approximately 180 degrees about pivot axis PA such that a front side 140 and rear side 156 of the blade cartridge 22 may be used.

The head assembly 20 may be selectively detachably connectable to the handle 60. The blade cartridge support member 24 may include a support hub 50, which may be centrally disposed between the two support arms 30. The support hub 50 includes a mechanical connection element 52 which mechanically connects the blade cartridge support member 24 to a mechanical connection element 64 of elongated shaft 62 of handle 60.

The shaving device 10 may include one or more blade cartridge pivot biasing mechanisms 90 to control the rotation of the blade cartridge 22 about a pivot axis PA. Pivot biasing mechanism 90 may include one or more elongated cylindrical rods 92 which slide within cylindrical recess 94 of handle 60. The elongated cylindrical rod 92 may be biased (e.g., springs or the like) generally towards the blade cartridge 22.

The rod 92 may contact the blade cartridge 22 at a location above the pivot axis PA, and the pivot biasing mechanism 90 may urge the blade cartridge 22 in the opposite direction. Alternatively, the rod 92 may contact the blade cartridge 22 at a location below the pivot axis PA and the pivot biasing mechanism 90 may urge the blade cartridge 22 in the opposite direction. As such, depending on where the biasing rod 92 contacts the blade cartridge, the pivot biasing mechanism 90 may urge the blade cartridge 22 generally in either direction or may generally inhibit rotation of the blade cartridge 22. In at least one embodiment, blade cartridge 22 may be configured to rotate approximately 180 degrees or more about the pivot axis PA such that the user can select either the front or rear surfaces 140, 156 of the blade cartridge 22. For example, the blade cartridge 22 may include shaving (razor) blades on both the front side 140 and rear side 156 thereof.

According to one embodiment, the pivot biasing mechanism 90 may optionally include an actuation button 100. The actuation button 100 may be coupled to the rod 92 and may be configured to retract the rod 92 out of the path of the blade cartridge as the blade cartridge 22 is rotated.

A blade cartridge rotation limiter may comprise a resilient, deformable stop member or pawl 36 configured to contact against an opposite side of the blade cartridge 22. For example, the deformable pawl 36 may contact an edge region of the blade cartridge 22 at a location below the pivot axis PA once the blade cartridge 22 pivots about pivot axis PA beyond a certain/predetermined point (degree of rotation).

To rotate the blade cartridge 22 to select a different face (e.g., either face 140 or face 156), the user may retract the bias pin 92 out of the path of the blade cartridge 22, and may then rotate the blade cartridge 22

The illustrated design suffers from several drawbacks including an external rotation biasing rod 92 that can be easily damaged and a mechanism which may encourage handling of the blade cartridge during rotation. Physical contact with the blade cartridge, particularly in a wet and/or soapy condition has inherent risk. Accordingly, it would be desirable to have a razor with a blade inclusive head that provides more than one blade or set of blades to prolong its useable life. Preferably, the rotatable blade mechanism would be simple to operate.

BRIEF DESCRIPTION

The following summary of the invention is provided for illustration purposes. It is not intended as a limitation on the scope of the invention.

According to a first embodiment, a razor apparatus including a head having at least one blade member on each of a first and a second opposed side of the head is provided. Each blade member has a straight front cutting edge and a rear non-cutting edge. The head includes a frame defining an opening through which the cutting edges are accessible. The frame also includes a rotatable mounting element for attachment of the head to a handle. The head is rotatable around a longitudinal axis of the handle at least 180° when the rotatable mounting element is activated.

According to a further embodiment, a wet razor is provided. The razor includes a handle. The razor also includes a shaving head having first and second shaving surfaces wherein each of the first and second shaving surfaces are elongated and extend along a width. Each shaving surface has one more blades with a cutting edge extending parallel to the width of the shaving head. The second shaving surface also has one or more blades having a cutting edge extending parallel to the width of the shaving head. A drum is rotatably mounted into the handle. The drum can rotate between a first configuration in which the first shaving surface orients at a front side of the handle to allow shaving while the second shaving surface is oriented at a rear side of the handle. The drum also provides a second configuration in which the positions of said first shaving surface and said second shaving surfaces are reversed. The razor further includes an actuating mechanism connected to the drum that causes rotation of the drum between the first and second configurations. The actuating mechanism includes a manually operable actuator slidingly mounted on the handle to effect rotation of the drum.

According to an additional embodiment, a method for reversing a razor blade cartridge is provided. The method includes providing a razor apparatus having a head with at least one blade member on each of a first and a second opposed side. The head is rotatably mounted to a handle. Rotation is initiated by a device disposed on the handle to cause 180° of rotation of the head around a longitudinal axis of the handle.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
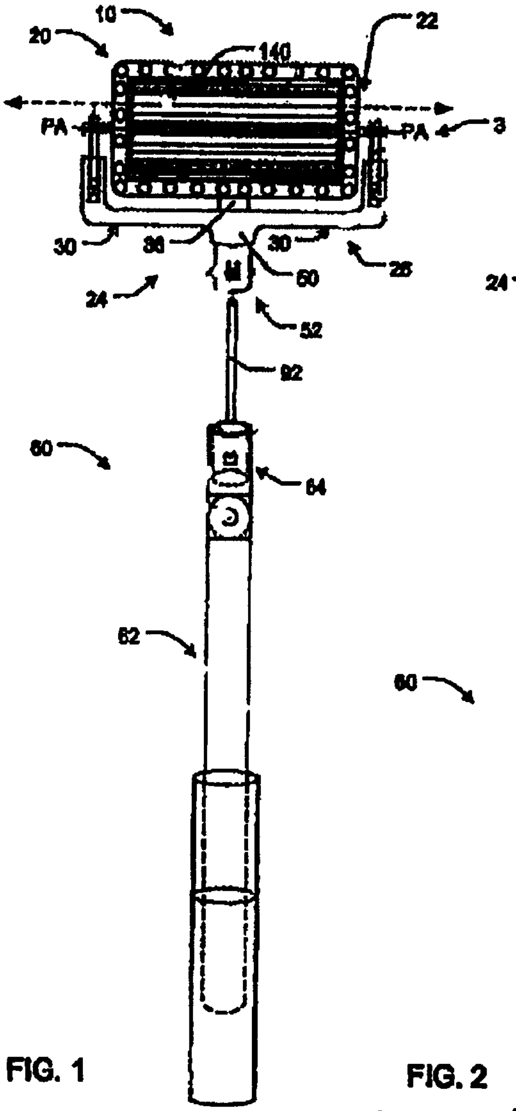
FIG. 1 (Prior Art)
FIGS. 1 and 2 are illustrations of a prior art razor.
Figure 2:
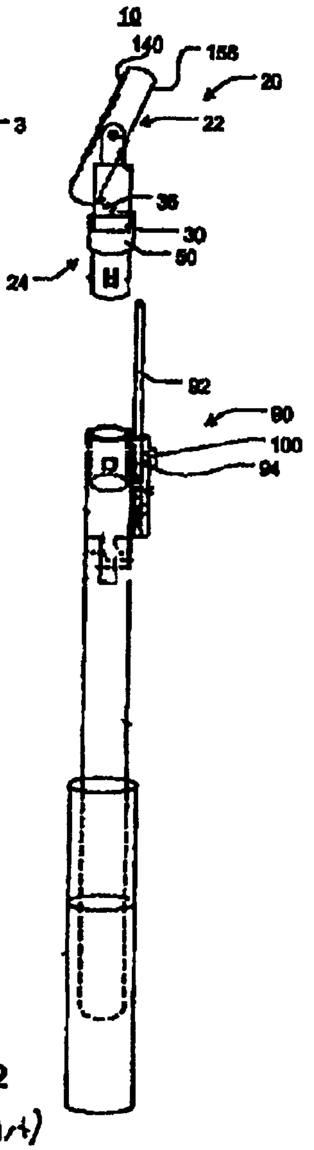
FIG. 2 (Prior Art)

Hereinafter, exemplary embodiments of the present invention are described in detail with reference to the accompanying drawings. Detailed descriptions of well-known functions and structures incorporated herein may be omitted to avoid obscuring the subject matter of the present invention.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used herein, the terms about, generally and substantially are intended to encompass structural or numerical modifications which do not significantly affect the purpose of the element or number modified by such term.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

The razor of the present disclosure can include a handle holding a blade cartridge that will rotate 180° when the first blade side is dull and used. The slide button can include a locked first position and a locked second position wherein the bridge rotates when the button is slid toward the head end of the razor. The locked first position locates a first side of the blade cartridge facing the shaving side of the razor and the locked second position locates the second side of the blade cartridge on the shaving side of the razor. The slide button can further include a cartridge ejection position. The present disclosure provides rotation of a blade cartridge without human physical contact with the blade cartridge. Further, the present disclosure effects rotation at a robust joint of the handle.

Figure 3:
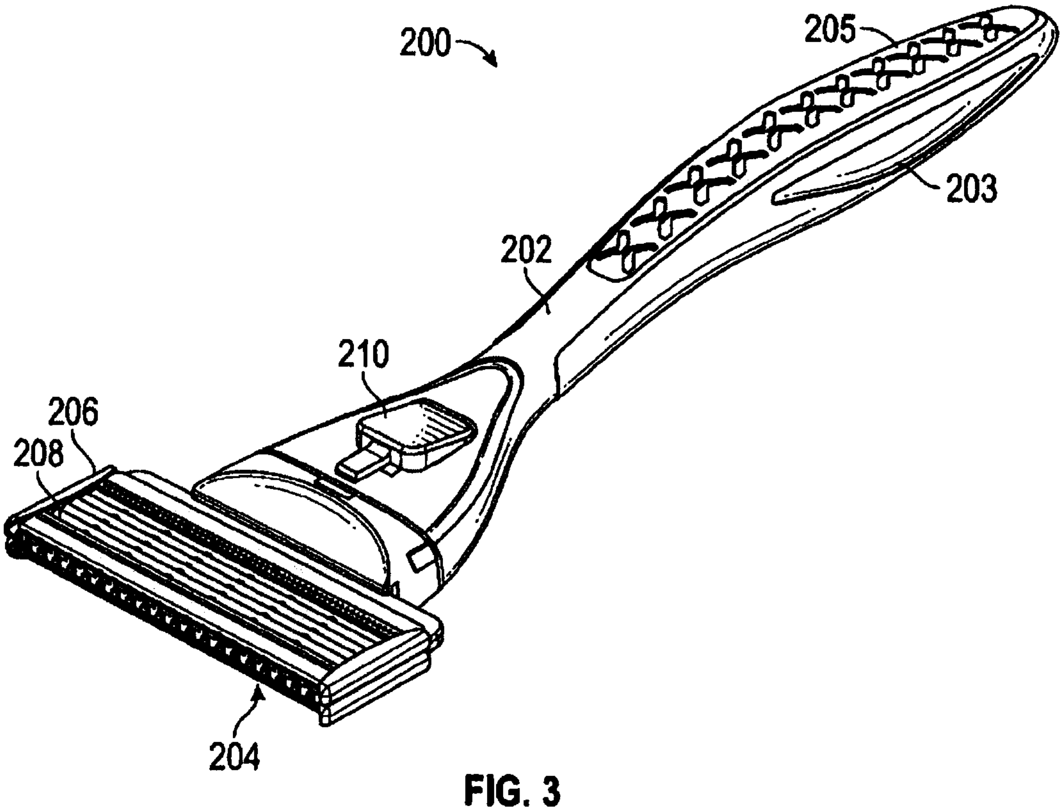
FIG. 3 is a rear perspective view of a razor of the present invention.
Figure 4:
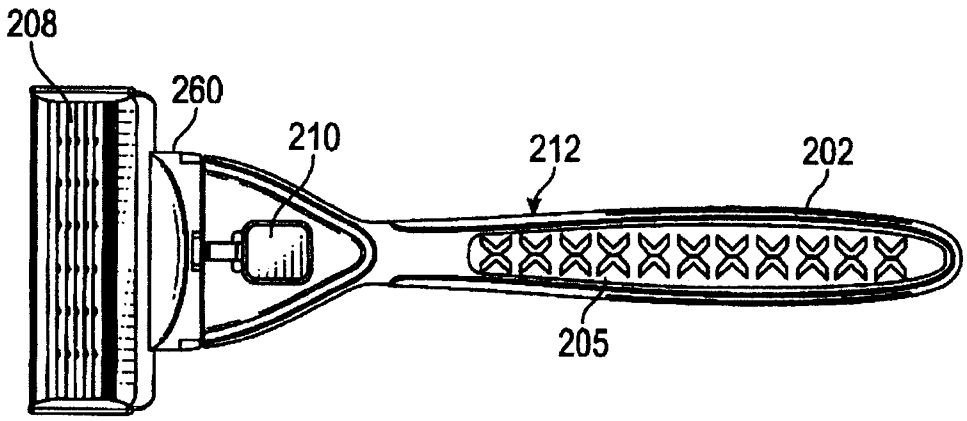
FIG. 4 is a back side plan view of the razor.
Figure 5:
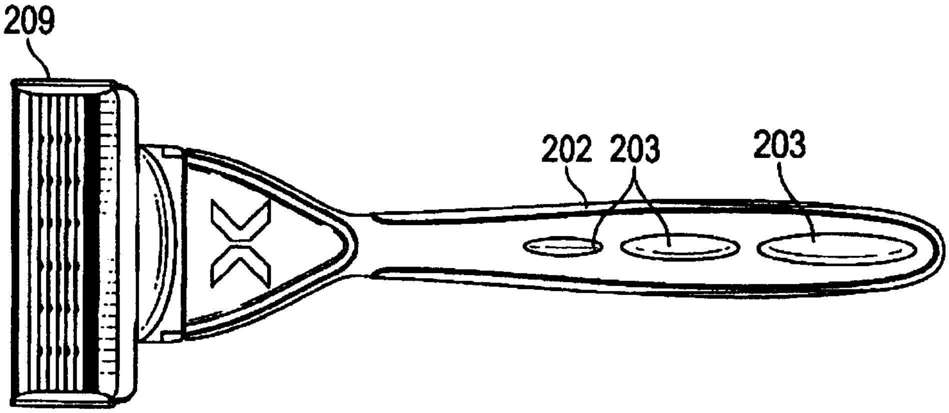
FIG. 5 is a front side plan view of the razor.

Referring now to FIGS. 3-5, razor 200 includes handle 202 and blade cartridge 204. The handle 202 can be formed of a material such as a polycarbonate or a metal such as aluminum alloy. The handle 202 can also include grip pads 203 and 205 formed of an elastomeric material. Blade cartridge 204 includes a frame 206 in which first side blades 208 are located. Frame 206 further houses second side blades 209. Slidable actuator button 210 is provided on the handle 202 to provide rotation of the blade cartridge 204 as described herein below. A primary gripping surface 212 is formed by pad 205 on the back side which provides an ergonomic configuration wherein a blade side of cartridge 204 is oriented for functional engagement with a user's body. Pads 203 can be provided on the front side of handle 202 to provide a desirable tactile engagement with a user's fingers.

Figure 6:
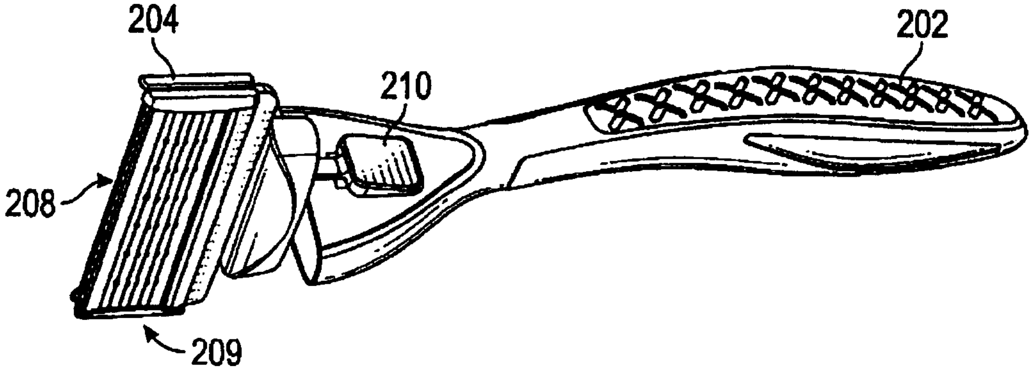
FIG. 6 is a rear perspective view of the razor with its head rotating between a first shaving position and a second shaving position.
Figure 7:
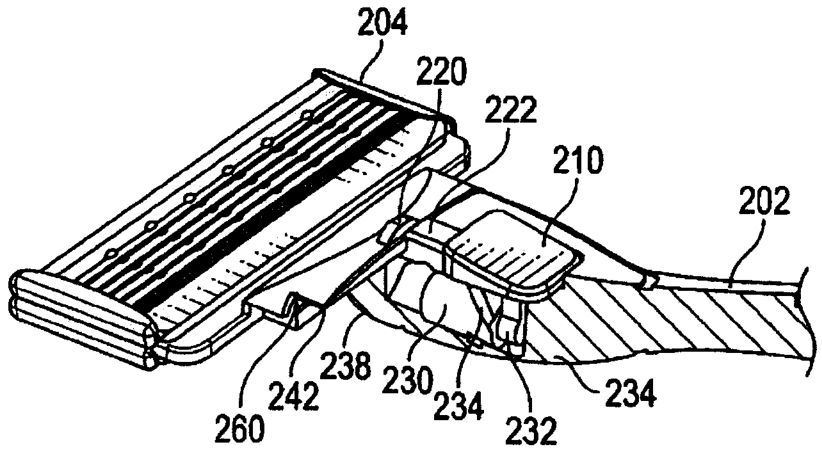
FIG. 7 is a close-up partial cross-section illustration of a head rotation feature of the razor.
Figure 8:
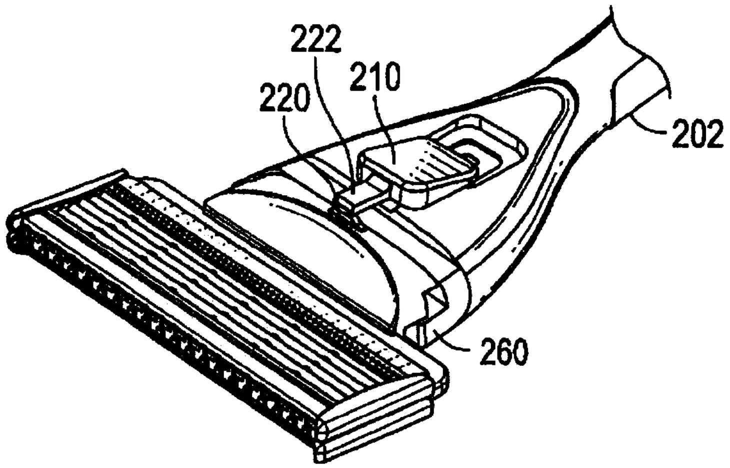
FIG. 8 is an illustration of a blade cartridge ejection feature.

With reference to FIGS. 6, 7 and 8, the blade cartridge 204 rotation and ejection mechanisms are depicted. Moreover, the slidable actuator button 210 causes the blade cartridge 204 to be rotated around the longitudinal axis of the handle 202 from a first side position to a reversed position. More particularly, after the first side 208 has been sufficiently used to become dull, the blade cartridge 204 is rotated such that the second side blades 209 are rotated into a shaving position as encouraged by the ergonomic shape of the handle 202.

Figure 9:
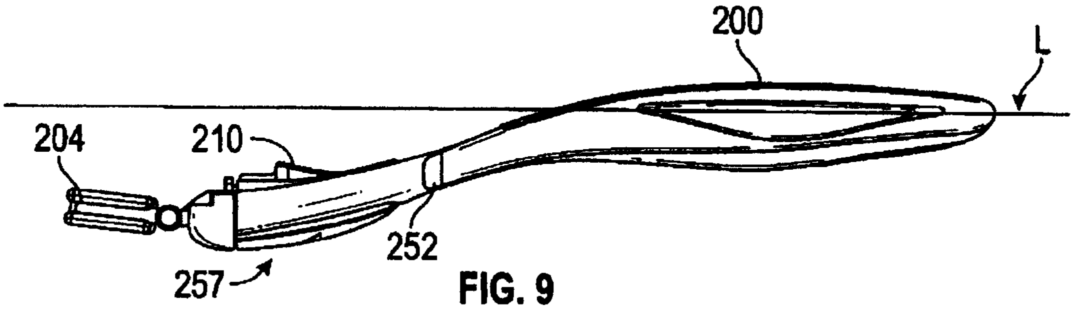
FIG. 9 is a side plan view of the razor.
Figure 14:
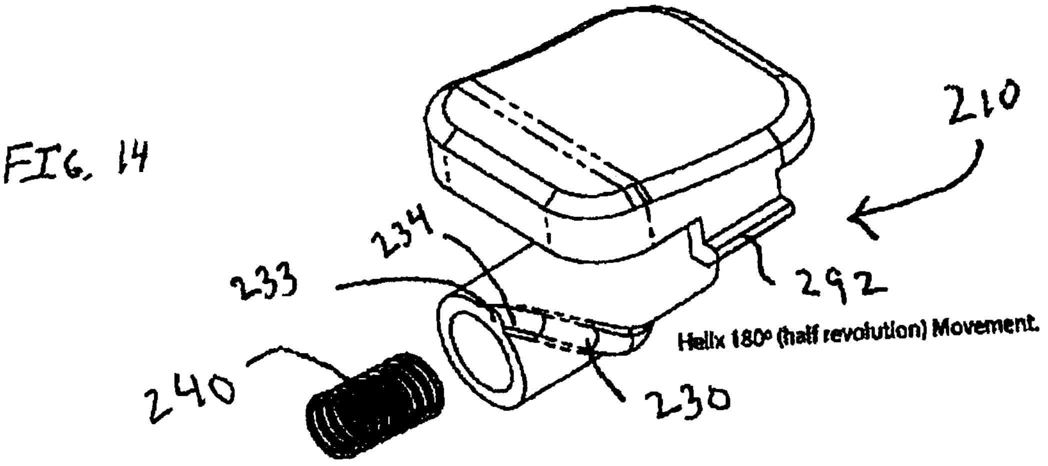
FIG. 14 provides a detailed view of the slide button and worm gear elements of the rotation mechanism.
Figure 15:
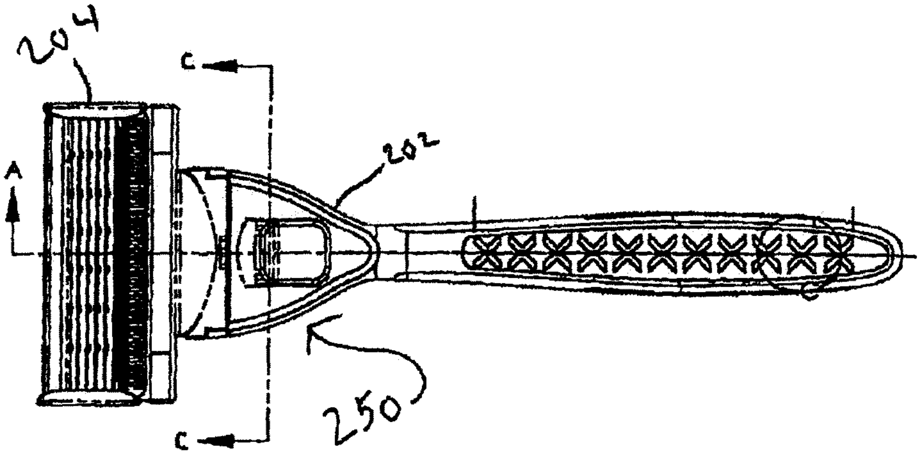
FIGS. 15-15C provide front, cross-section and detailed views of the handle and cartridge mating region.
Figure 15A:
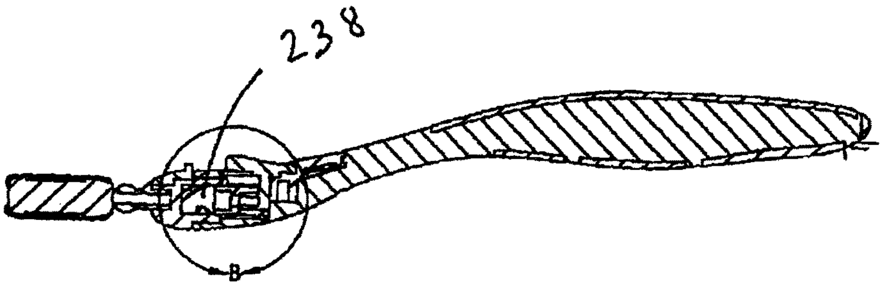
Figure 15B:
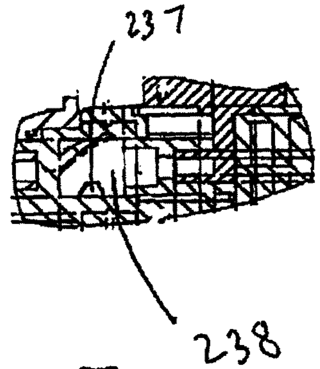
Figure 15C:
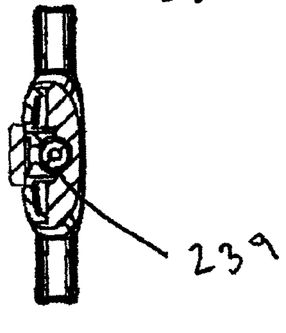

Referring now to FIG. 9, the longitudinal axis "L" of the razor is depicted. As illustrated, the razor handle 202 can have a front side curve 252 which places blade cartridge 204 forward relative to the longitudinal axis when gripped by a user in the ergonomic operating position. This provides a razor shape which encourages shaving with side 257 of the razor Referring now also to FIG. 14, the actuator button 210 is illustrated in greater detail. Particularly, slidable actuator button 210 is shown to include a worm gear 230 configured to mount rotatably upon a post 232 formed integrally on the slidable actuator button 210. Groove 234 formed in the surface of worm gear 230 engages a projection 237 (see FIG. 15B) on the wall of the chamber 238 housing the worm gear 230, causing rotation thereof when slidable actuator button 210 is pushed forward.

Worm gear 230 also includes a key 233 which mates with a keyway 239 in projection 236 on rotation member 242. Slidable actuator button 210 can be pushed forward such that rotation member 242 rotates 180 degrees, orienting an opposed side of the blade cartridge 204 into a shaving position.

Spring 240 can be included to provide a bias between rotation member 242 and the slidable actuator button 210 such that rotation of the blade cartridge 204 is only initiated when intentional movement of the slidable actuator button 210 is performed by the user.

More particularly, the blade cartridge is mounted to the handle in a rotatable manner via a post element within the handle. The post is received within a socket formed in the head. A slidable locking member is further secured to the handle. The locking member allows selective rotation and disengagement of the head. In an engaged state, the head is rotatable on the post to allow the working surface of the head to be changed. In a disengaged state, the head is removable from the handle and a replacement head can be substituted therefore.

Figure 16:
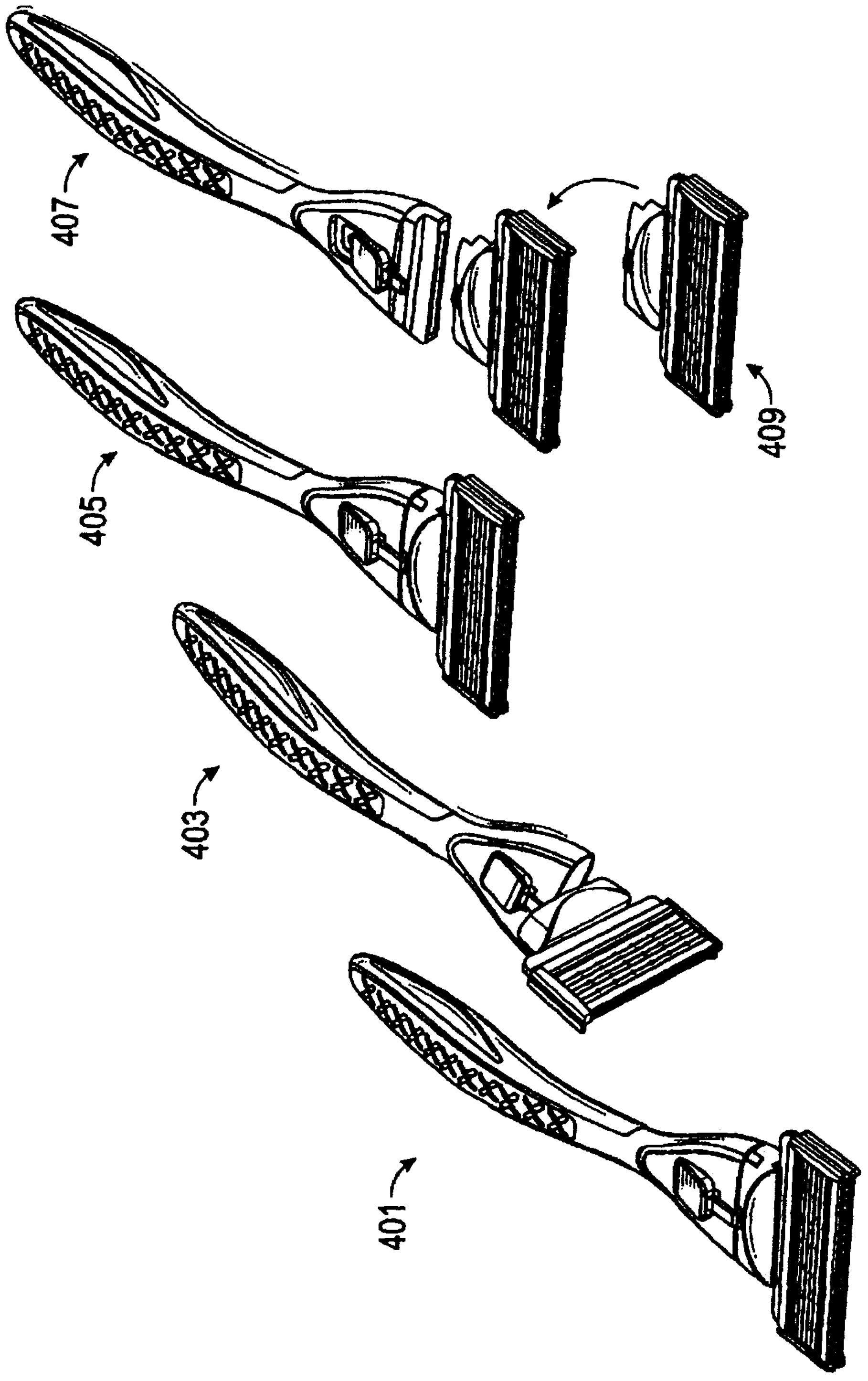
FIG. 16 is a schematic illustration of the sequence of cartridge rotation and further including cartridge removal.

As shown in FIGS. 8 and 16, a third position (further forward) for slidable actuator button 210 allows projection 222 to engage tab 220 such that blade cartridge 204 becomes disengaged from the handle 202. Slidable actuator button 210 can then be retracted to a starting position and a replacement blade cartridge 409 attached to the original handle.

As schematically illustrated in FIG. 16, the present razor includes a first cartridge side shaving position 401, a rotation stage 403 leading to a second cartridge side shaving position 405, and a blade cartridge ejection stage 406 allowing a replacement cartridge 409 to be attached to the razor handle.

Figure 10:
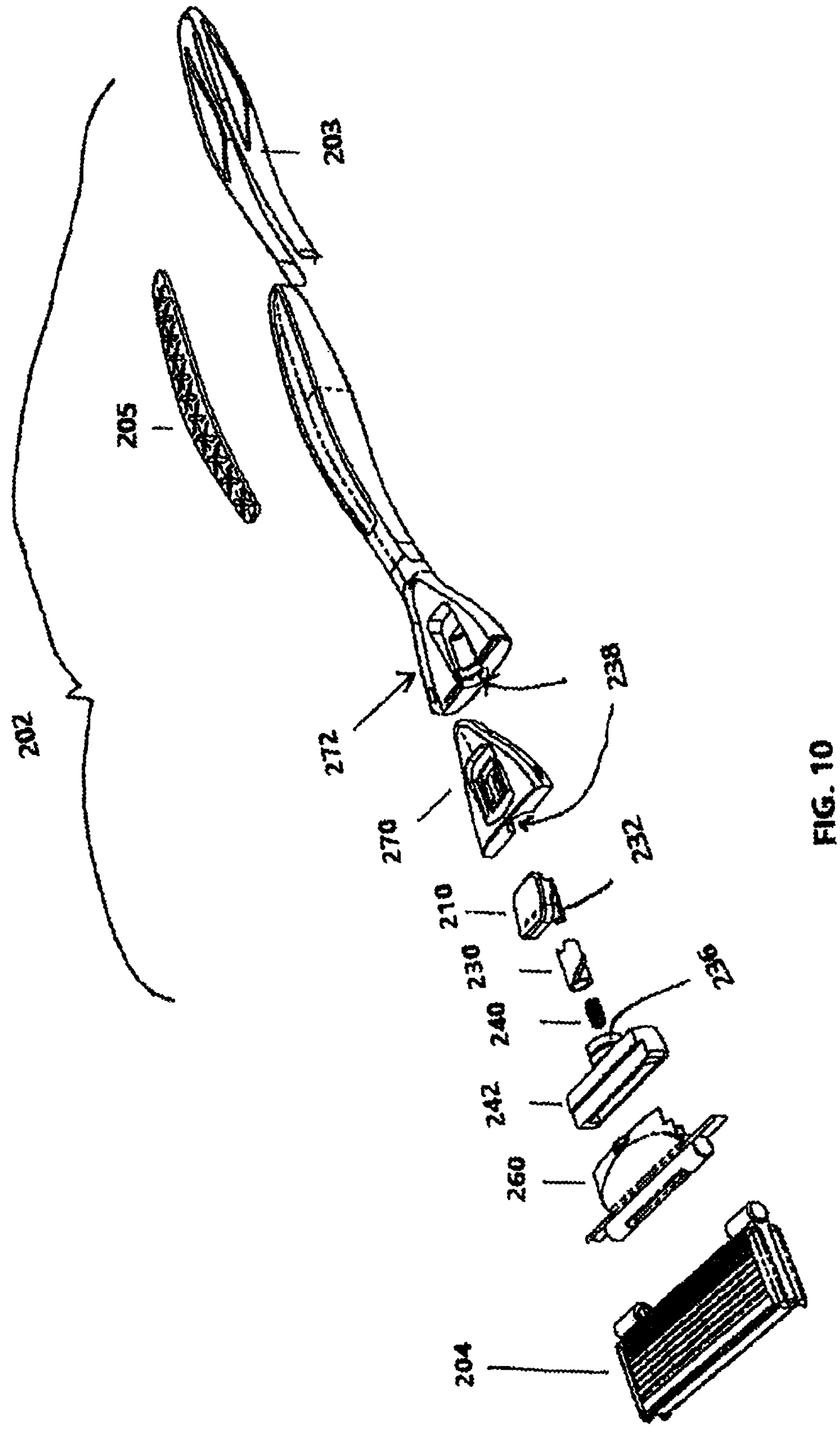
FIG. 10 is an exploded view of the razor components.
Figure 11:
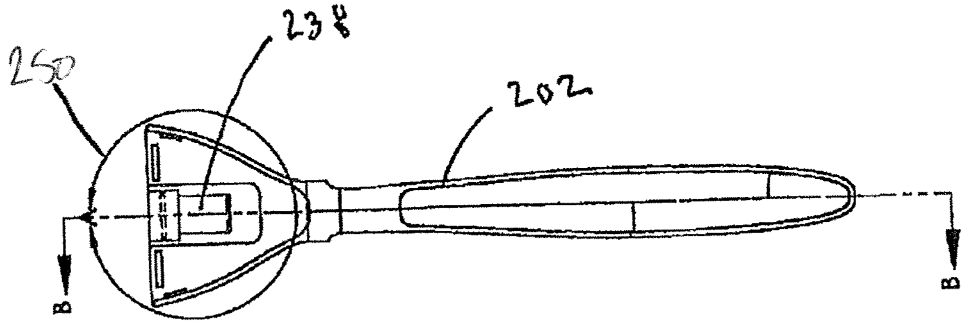
FIGS. 11-11C provide front, cross-section and exploded views of the razor handle.
Figure 11A:
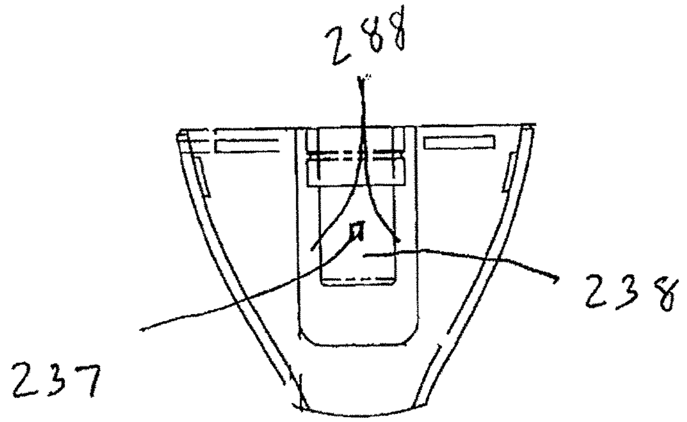
Figure 11B:
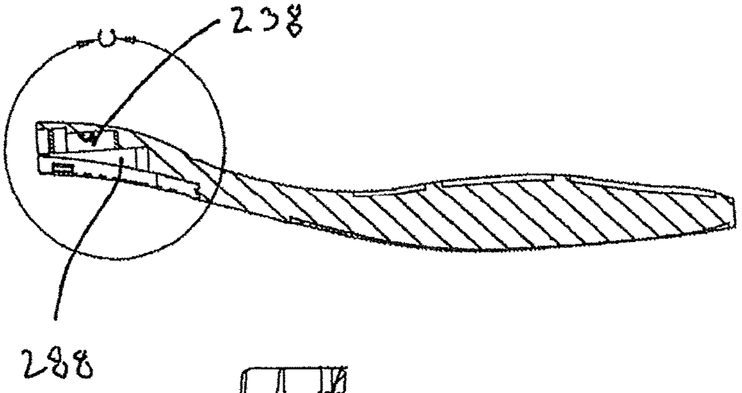
Figure 11C:
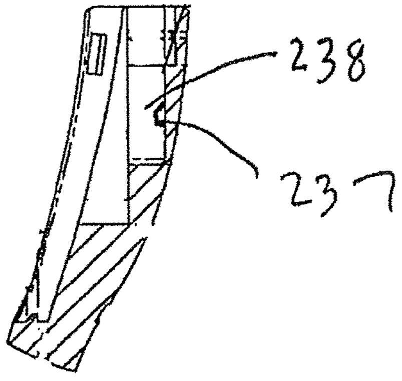

FIG. 10 provides an exploded view of the various components in a disassembled condition. These components include blade cartridge 204, connecting folding joint 260, rotation head 242, spring 240, worm gear 230, side button 210, and handle 202. Handle 202 includes head 272 with cover 270, top grip pad 205 and bottom grip pad 203.

FIGS. 11-11C and 15-15C provide detailed illustrations of the various components of the cartridge handle 202 engagement region 250. Region 250 receives the internal components of slide button 210 including post 232, and worm gear 230.

Head 272 in combination with cover 270 forms cavity 238 suitable for receiving slide button 210 and includes channels 288 that define a slide path for wings 292 of slide button 210.

Figure 12:
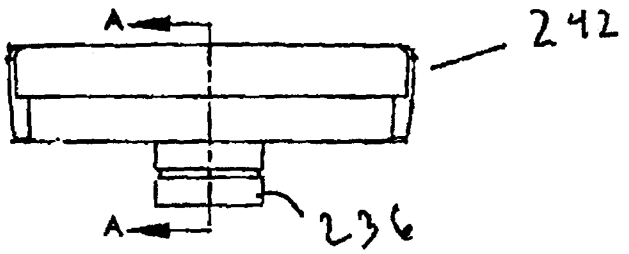
FIGS. 12-12B provide front, cross-section and perspective views of the rotating head of the razor.
Figure 12A:
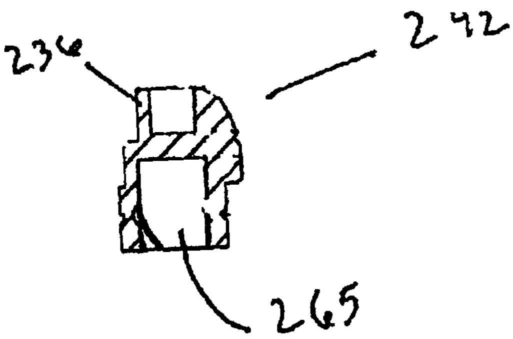
Figure 12B:
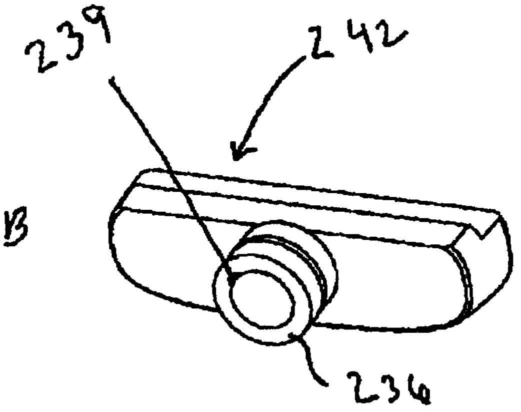

FIGS. 12-12B illustrate the rotatable head 242. Rotatable head 242 includes projection 236 receiving the worm gear 230 and recess 265 receiving connecting folding joint 260.

Figure 13:
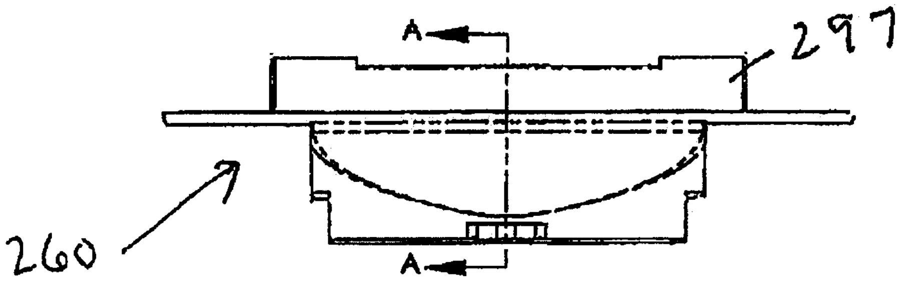
FIGS. 13-13B provide front, cross-section and perspective views of the handle-blade cartridge connection joint of the razor.
Figure 13A:
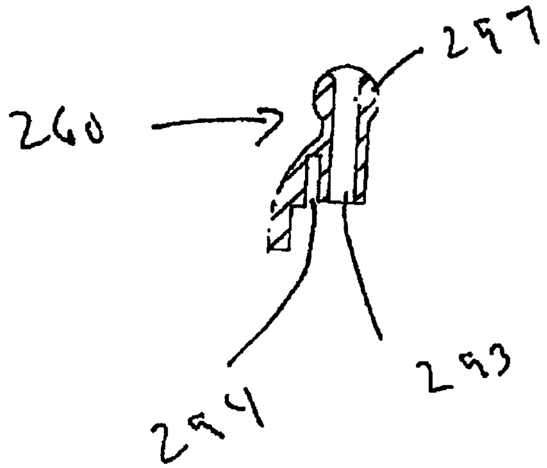
Figure 13B:
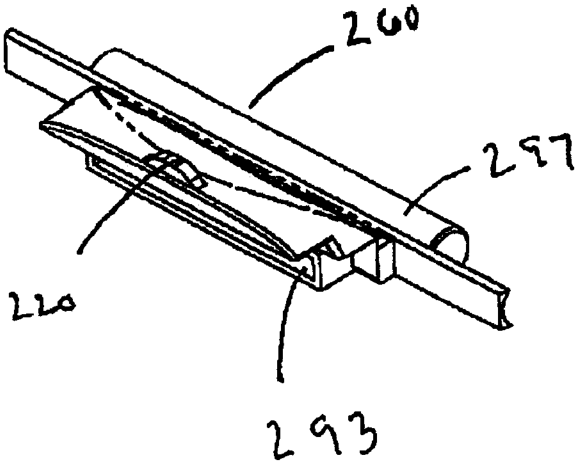

FIGS. 13-13B illustrate the connecting folding joint 260 which is disposed between the blade cartridge 204 and the rotatable head 242. Connecting folding joint 260 includes chamber 293 and slot 294 configured to releasably receive rotatable head element 242. Connecting folding joint 260 further includes bar mount 297 configured to receive barrel elements 298 of blade cartridge 204 and establish a slight flexing action with respect to the blade cartridge in use.

Figure 17:
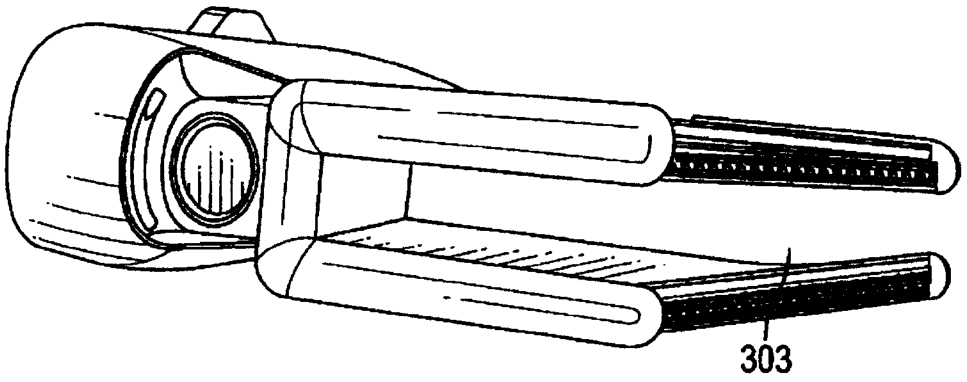
FIG. 17 illustrates a hinge between opposed blade sides of the blade cartridge.

With reference now to FIG. 17, a further aspect of the present razor is depicted. Particularly, the razor includes a hinge 303 disposed between the opposed first side of blades and the opposed second side of blades. The hinge can be a flexible sheet of plastic or rubber, such a PVC, nylon, polyethylene, polypropylene, polyurethane, natural rubber, EPDM, silicone rubber, polyisoprene, polybutadiene, and mixtures thereof. In certain embodiments, the hinge limits the range of motion of the blades. The range of motion, the flex and the preload tension can be determined by thickness and the type of material used in constructing the hinge. The hinge can allow the razor to provide a range of motion bi-laterally.

The hinge can advantageously also prevent shaving elements (water, shaving cream, removed hair) from reaching the opposed unused side of blades. In this regard, it may be advantageous for the hinge to cover all or at least a significant area (e.g. >75%) of the interface between the opposed blade sides.

The blades may be formed from a base material such as stainless steel. Particularly, in the base material such as a stainless steel, in order to increase hardness of the razor blade, a heat treatment process is performed, and then in order to form a razor blade edge, a grinding process is performed. Thereafter, a process of depositing various coating materials on an edge of a final razor blade is performed.

In accordance with another aspect of the invention a polycrystalline ceramic substrate blade is provided. The ceramic material can be polycrystalline alumina. In particular embodiments, the razor blade polycrystalline ceramic substrate material is selected from the group consisting of silicon carbide, silicon nitride, mullite, hafnia, yttria, zirconia, and alumina, and has a grain size of less than five thousand Angstroms and a bend strength in excess of 300 MPa; the sputter-etched surfaces immediately adjacent the cutting edge have widths of about 0.1 micrometer and an effective included angle substantially greater than the included angle of the mechanically abraded facets, and the blade further includes a sputter-deposited layer of electrically conductive metal of less than five hundred Angstroms thickness on the cutting edge, and an adherent polymer coating of less than ten micrometers thickness on the metal coated cutting edge. Ceramic blades typically exhibit excellent mechanical characteristics such as high hardness, anti-corrosion capability, and wear resistance.

Ceramic blades can be formed as green ceramic bodies by molding or injection and subsequently sintered. Since the ceramic bodies are quite thick, further machining treatments such as cutting and polishing are required to thin the ceramic bodies and create edges. However, machining treatments may cause surface roughness and defects such as induced residual stress.

U.S. Pat. No. 6,151,786, the entirety of which is hereby incorporated by reference, discloses a ceramic blade formed by injection. Injection alone, however, cannot directly form a thin blade, thereby applications of the injected ceramic blade are restricted.

U.S. Pat. Nos. 5,121,660, 5,048,191, and 5,056,227 the entirety of which are hereby incorporated by reference, disclose ceramic blades mechanically treated by, for example, grinding and polishing, to reach a desired thickness. Mechanical treatments may, however, cause surface roughness and induced residual stress. Thus, an additional protective layer is required to increase strength and toughness.

A coating layer can be applied on both sides and the edge, wherein the ceramic body is formed using a scraper to create a substantially flat surface and prevent residual stress damage. The coating material may be used in a thin film of a metal-based or ceramic-based carbide, nitride, and oxide, which are a general hard thin film material. Further, after the hard thin film material is coated at the razor blade, when a user shaves, the hard thin film material decreases a friction with a skin, and in order to improve a shaving performance, an organic material of PolyTetraFluoroEthylene (hereinafter, referred to as 'PTFE') may be deposited. Therefore, in order to increase adhesive strength between the razor blade and the hard thin film and an organic material such as the PTFE, a metal thin film of Chromium (Cr), Titanium (Ti), Tungsten (W), and Niobium (Nb) may be deposited between the PTFE and the hard thin film.

Diamond materials may also be used for the blades. This could include either polycrystalline diamond materials or monocrystalline diamond is possible. Monocrystalline diamond is extremely difficult to produce and to machine, on the one hand, and, on the other hand, it is very expensive so that it is likely to be unsuitable for use in mass-produced products, such as for example razor blades. Polycrystalline diamond layers, as are used in the state of the art, are distinguished by a clearly heterogeneous distribution of the size of the crystalline domains.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

The invention claimed is:

1. A razor apparatus including a head having at least one blade member on each of a first and a second opposed side of the head, each blade member having a straight front cutting edge and a rear non-cutting edge, the head including a frame defining an opening through which the cutting edges are accessible, a hinge disposed between the first and second opposed sides of the head, the frame having a rotatable mounting element for attachment of the head to a handle, wherein said rotation is around a longitudinal axis of said handle and wherein said head is rotatable at least 180° when the rotatable mounting element is activated.

2. The razor of claim 1 wherein the rotatable mounting element includes a spring.

3. The razor of claim 1 wherein said rotatable mounting element includes a rotation inducing button having a first position in which the first side of the head is in a shaving position and a second position in which a second side of the head is in a shaving position wherein rotation of the head is implemented by movement of the button, and a third position wherein said button disengages said head from the razor handle.

4. The razor of claim 3 wherein said button includes a position allowing mechanically induced rotation of the head.

5. The razor of claim 3 wherein said rotation inducing button includes a projection configured to engage a tab on said head during disengagement of the head from the razor handle.

6. The razor of claim 1 wherein said handle is configured to receive a replacement head.

7. The razor of claim 1 wherein said hinge is comprised of a flexible plastic or rubber.

8. The razor of claim 1 wherein said hinge fills at least 75% of a space between opposed blade members.

9. The razor of claim 1 wherein said head comprises a "U" shaped body.

10. The razor of claim 1 wherein said rotatable mounting element further comprises a chamber receiving a cylindrical body.

11. The razor of claim 1 including multiple blades on each side of the head.

12. The razor of claim 1 further comprising a slide button including a first position in which the first side of the head is in a shaving position and a second position in which a second side of the head is in a shaving position wherein rotation of the head is implemented by movement of the slide button between the first and second position, and a third position wherein said slide button disengages said head from the razor handle, wherein said slide button is closer to said longitudinal axis than said head.

13. The razor of claim 1 wherein said handle further comprises a chamber receiving said rotatable mounting element.

14. The razor of claim 13 further comprising a cover closing said chamber.

15. The razor of claim 1 wherein a terminal end of the head and a terminal end of the handle which face each other, each include a substantially equivalent circumferential shape and size.

16. A razor apparatus including a head having at least one blade member on each of a first and a second opposed side of the head, each blade member having a straight front cutting edge and a rear non-cutting edge defined by opposed ends, the head including a frame defining an opening through which the cutting edges are accessible, the frame having a rotatable mounting element for attachment of the head to a handle, wherein said handle includes an ergonomic gripping surface and wherein rotation of said head arranges a fresh at least one blade member into a shaveable configuration with the ergonomic gripping surface, wherein said rotation is around a longitudinal axis of said handle such that the blades rotate end to end, wherein said head is rotatable at least 180°, and wherein said ergonomic gripping surface includes an arcuate section such that the head is positioned off of a longitudinal axis of the handle at the gripping surface and is closer to an intended shaving surface.

17. A method for reversing an orientation of a razor blade cartridge on a razor handle comprising providing a razor apparatus including a head having at least one blade member on each of a first and a second opposed side of the head, the head having a rotatable mounting element for attachment to the handle, and rotating said head end to end causing 180° of rotation of said head around a longitudinal axis of said handle.

* * * * *